(12) United States Patent
Jacobsen et al.

(10) Patent No.: US 6,173,640 B1
(45) Date of Patent: Jan. 16, 2001

(54) BAND CONTROLLED VALVE/ACTUATOR

(75) Inventors: Stephen C. Jacobsen; Clark C. Davis, both of Salt Lake City; David F. Knutti, Taylorsville, all of UT (US)

(73) Assignee: Sarcos, L.C., Salt Lake City, UT (US)

(*) Notice: Under 35 U.S.C. 154(b), the term of this patent shall be extended for 0 days.

(21) Appl. No.: 09/466,553

(22) Filed: Dec. 17, 1999

Related U.S. Application Data

(62) Division of application No. 08/873,576, filed on Jun. 12, 1997, now Pat. No. 6,039,075.

(51) Int. Cl.$^7$ .................................................. F15B 13/04
(52) U.S. Cl. ...................... 91/457; 137/596.17; 251/901
(58) Field of Search ........................ 91/457; 137/596.17; 251/901

(56) References Cited

U.S. PATENT DOCUMENTS

| | | |
|---|---|---|
| 1,013,075 | 12/1911 | Scott . |
| 1,104,867 | 7/1914 | Blohut . |
| 2,349,368 | 5/1944 | Myers ..................................... 160/85 |
| 2,784,740 * | 3/1957 | Stageberg .......................... 251/901 X |
| 3,146,320 | 8/1964 | Wang et al. .............................. 200/5 |
| 3,334,656 * | 8/1967 | Boyle ................................ 251/901 X |
| 3,452,175 | 6/1969 | Wilkes ................................. 200/153 |
| 3,452,309 | 6/1969 | Wilkes ................................. 335/209 |
| 3,471,668 | 10/1969 | Wilkes ................................. 200/153 |
| 3,544,740 | 12/1970 | Robin .................................... 200/16 |
| 3,546,402 | 12/1970 | Spaeth ................................... 200/16 |
| 3,567,881 | 3/1971 | Duimstra ........................... 200/61.53 |
| 3,688,063 | 8/1972 | Bell .................................. 200/61.53 |
| 3,773,077 | 11/1973 | Barnebey ......................... 137/625.28 |
| 3,994,314 * | 11/1976 | Hartley ............................. 137/596.17 |
| 4,084,617 | 4/1978 | Happe ............................. 137/625.28 |
| 4,100,420 | 7/1978 | Metcalf et al. ....................... 250/561 |
| 4,147,183 | 4/1979 | Kalsi ............................... 137/625.28 |
| 4,157,462 | 6/1979 | Blanchard ......................... 200/61.45 |
| 4,182,368 * | 1/1980 | Hartley ............................. 137/596.17 |
| 4,203,015 | 5/1980 | Tuchscherer ...................... 200/61.45 |
| 4,220,944 | 9/1980 | Pudelko et al. ....................... 338/176 |
| 4,230,978 | 10/1980 | Gardella, Jr. et al. ............... 318/687 |
| 4,348,559 | 9/1982 | Chu ................................... 200/11 R |
| 4,380,692 | 4/1983 | Blanchard et al. ............... 200/61.48 |
| 4,533,798 | 8/1985 | Yatchum et al. .................. 200/11 R |
| 4,572,006 | 2/1986 | Wolfendale ....................... 73/862.64 |
| 4,649,759 | 3/1987 | Lee ................................... 73/862.64 |
| 4,767,973 | 8/1988 | Jacobsen et al. ..................... 318/652 |
| 4,789,803 | 12/1988 | Jacobsen et al. ..................... 310/309 |
| 5,238,023 * | 8/1993 | Kristoffer ......................... 251/901 X |
| 5,479,984 | 1/1996 | Easterbrook et al. ................. 165/96 |

OTHER PUBLICATIONS

Research Report SC–RR–67–656A, Dec. 1967.

* cited by examiner

Primary Examiner—Gerald A. Michalsky
(74) Attorney, Agent, or Firm—Thorpe, North & Western, LLP

(57) ABSTRACT

A band controlled valve apparatus for controlling fluid flow from a source to a sink, including a base (12) having an upper surface and an aperture (16) extending from the upper surface through the base (12) allowing the flow of fluid from the source through the base (12) to the sink when the aperture (16) is not covered, an elongate flexible band (8) with a first portion (8a) in contact with the upper surface of the base (12) and a second portion (8b) extending forwardly of the first portion (8a) then upwardly and rearwardly above at least a part of the first portion (8a), the second portion (8b) being actuated to selectively move the second portion (8b) of the band (8) forwardly or rearwardly to cover or uncover, respectively, the aperture (16) with the first portion (8a) of the band (8) to thereby prevent or allow, respectively, fluid flow through the aperture (16).

4 Claims, 5 Drawing Sheets

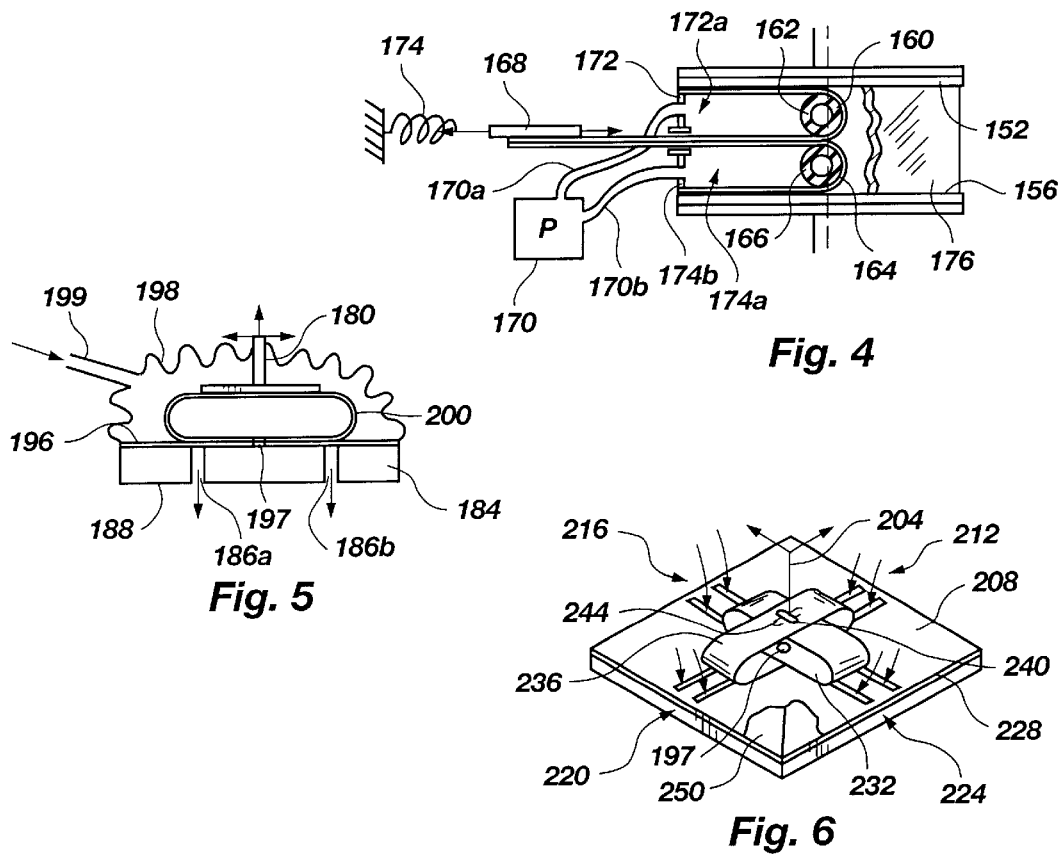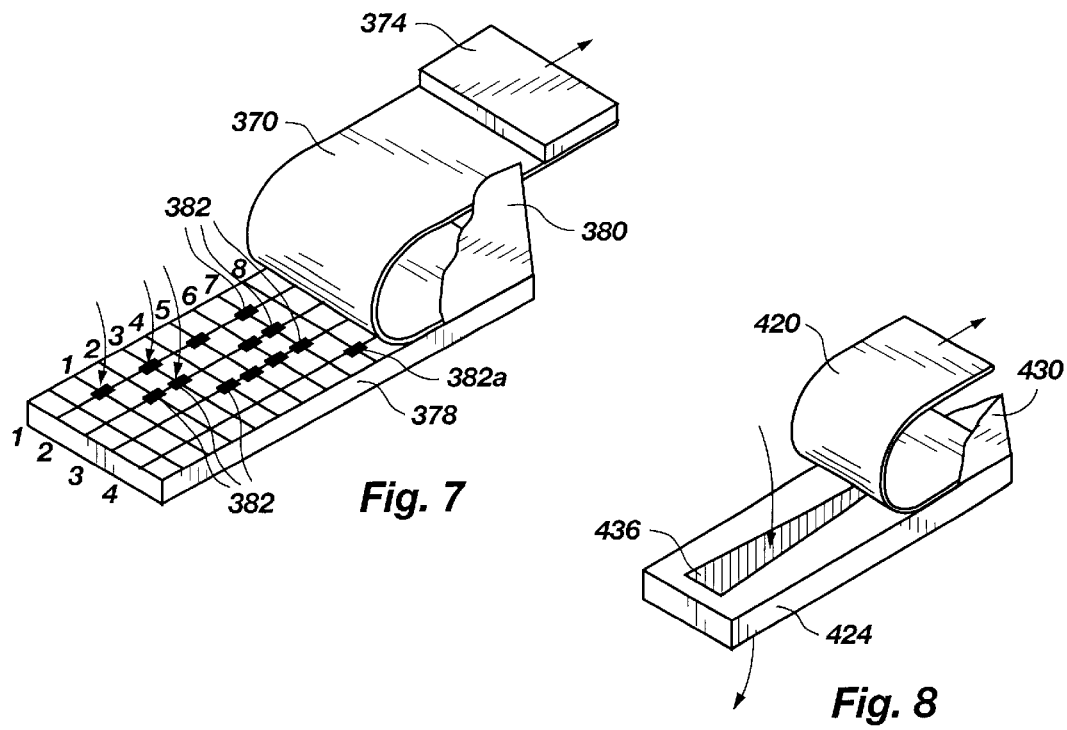

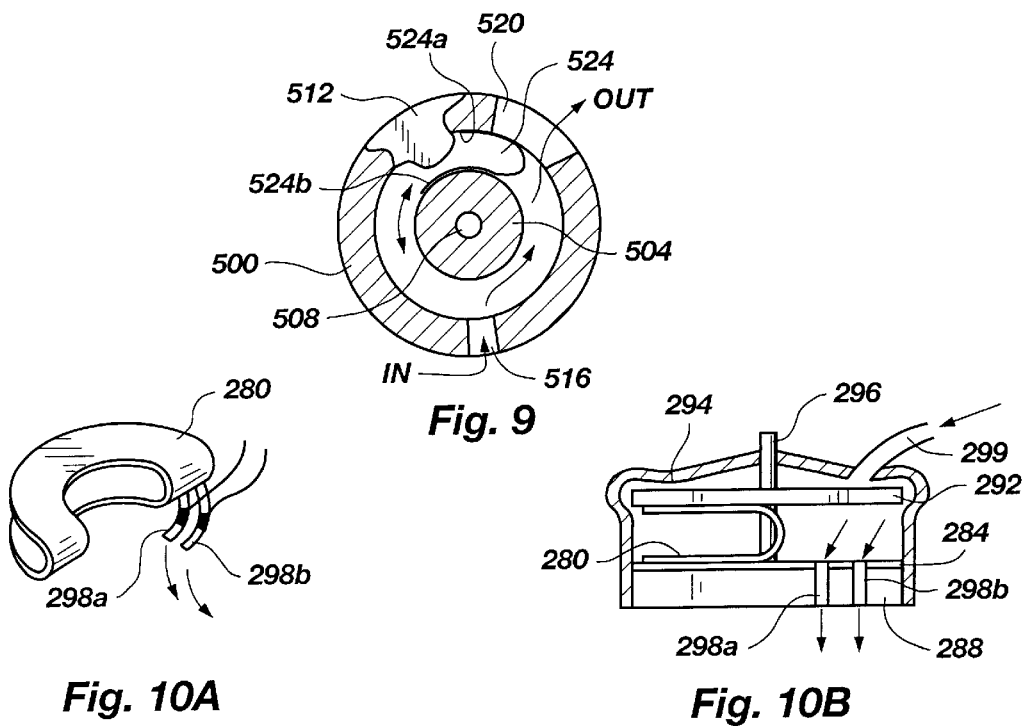
Fig. 9
Fig. 10A
Fig. 10B
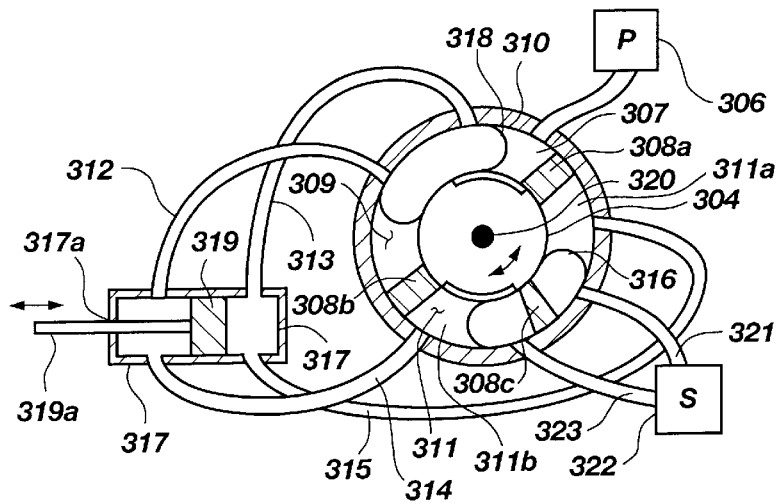
Fig. 11
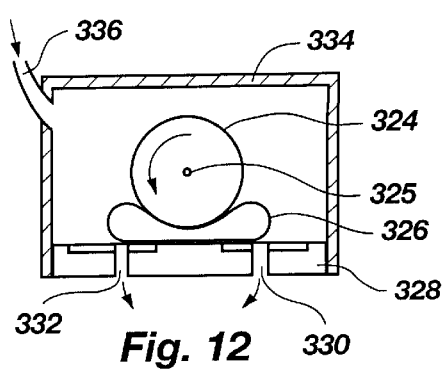
Fig. 12

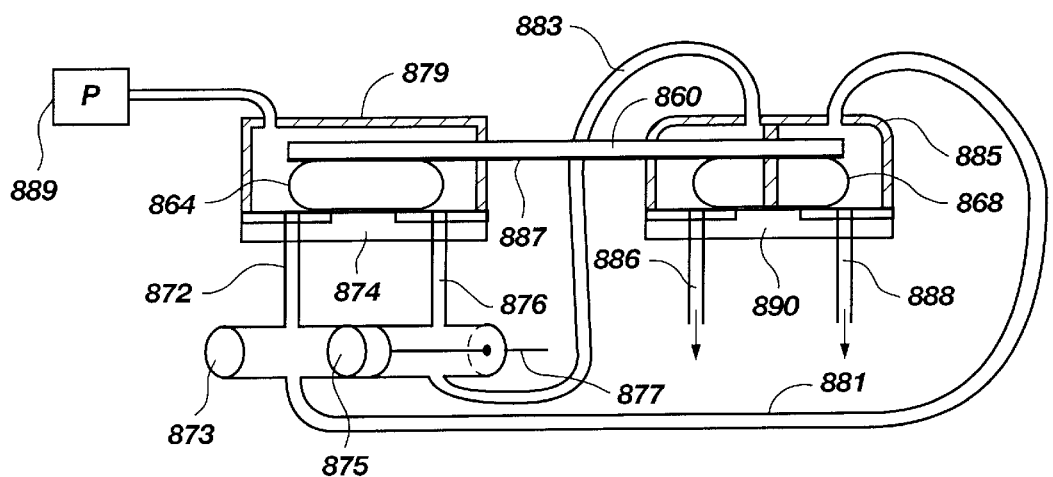
Fig. 16
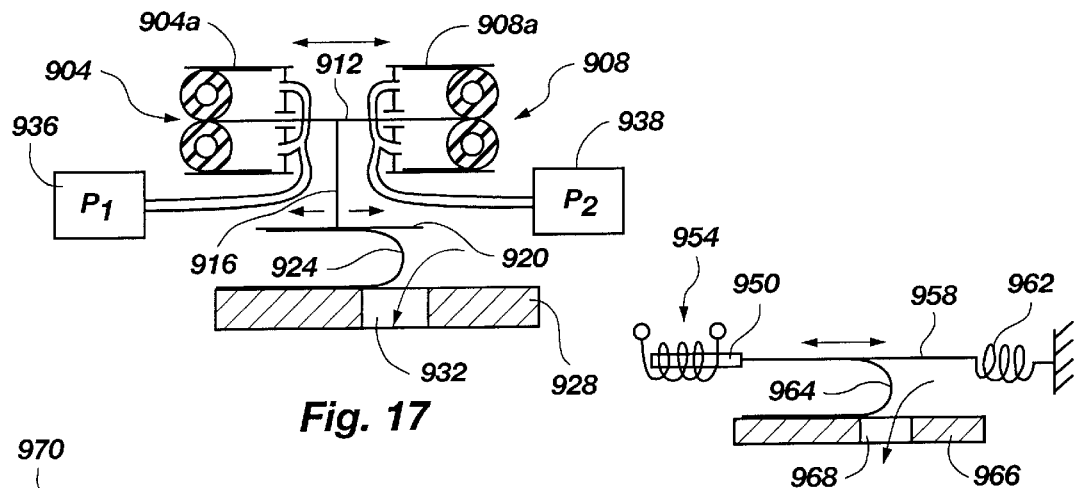
Fig. 17
Fig. 18
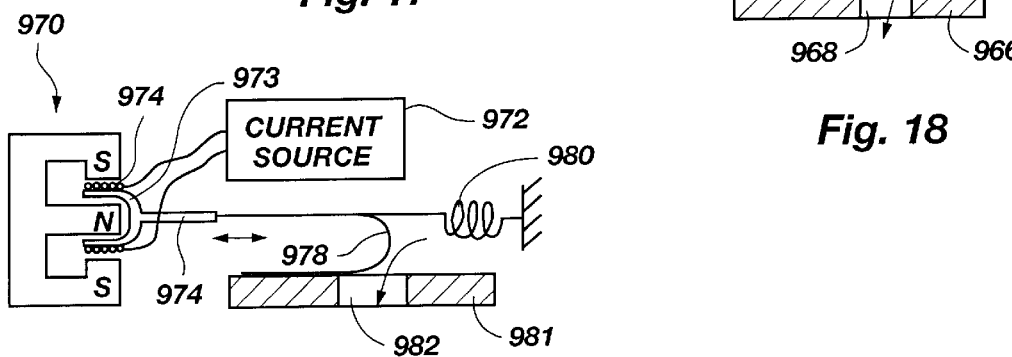
Fig. 19
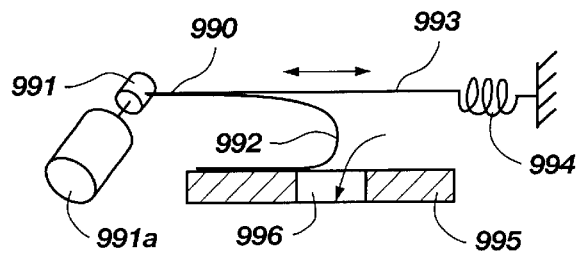
Fig. 20

BAND CONTROLLED VALVE/ACTUATOR

This is a Divisional Application of application Ser. No. 08/873,576 filed on Jun. 12, 1997, titled: BAND CONTROLLED VALVE/ACTUATOR, now U.S. Pat. No. 6,039,075.

BACKGROUND OF THE INVENTION

The invention relates in general to mechanical control apparatus for valves and actuators and, in particular, to apparatus which utilizes a flexible moveable band to control movement of fluids or to be controlled by movement of fluids.

In the fields of robotics, control of manufacturing processes, all types of fluid handling and transportation, and the like, it is oftentimes necessary to control the movement and positioning of mechanical components. For example, in robotic systems, it is necessary to control the movement and positioning of components such as an arm, finger or other grasping element, etc. It is desirable in the control of the movement and positioning of mechanical components that the movements be precise and fluid. It is also desirable that the mechanical systems be operable in a variety of environments, from underwater environments to outer space.

One approach to controlling the movement and positioning of mechanical components is the use of fluidics, a technology that employs fluid dynamic phenomena to perform sensing, control, information processing and actuation functions. Of course, in the use of fluids, a complex variety of valves are typically required, valves which should be reliable, precise and hopefully economical to manufacture and use.

SUMMARY OF THE INVENTION

It is an object of the invention to provide a simple, efficient and reliable band-controlled valve/actuator.

It is another object of the invention to provide such a valve/actuator which is compact and contains few moving parts.

It is a further object of the invention to provide such a valve/actuator which avoids the need for sliding, friction-producing components.

It is also an object of the invention to provide such a valve/actuator which may be used in a wide range of environments.

It is still another object of the invention to provide such a valve/actuator which requires low operating energy.

It is still a further object of the invention to provide such a valve/actuator which is inexpensive in construction and easy to use.

The above and other objects of the invention are realized in a specific illustrative embodiment of a valve for controlling the flow of fluid from a source to a sink, the valve including a base having an upper surface and an aperture extending from the upper surface through the base for allowing the flow of fluid from the source to the sink when the aperture is not covered. Also included is an elongate, flexible band disposed on the base, with a first portion of the band in contact with the upper surface of the base, and a second portion of the band extending forwardly of the first portion and then upwardly and rearwardly above at least a part of the first portion. Finally, a control mechanism is coupled to the second portion of the band to selectively move the second portion forwardly or rearwardly to respectively cover or uncover the aperture with the first portion of the band, to thereby respectively prevent or allow the flow of fluid through the aperture.

In accordance with one aspect of the invention, the aperture may be formed to be elongate in forwardly and rearwardly directions, with a varying width so that the amount of fluid allowed to flow through the aperture would depend upon how much of the aperture were uncovered.

In accordance with another aspect of the invention, a plurality of apertures may be provided to allow for control of fluid flowing to a plurality of sinks.

In still another aspect of the invention, the base may be formed to be cylindrical, annular, or simply flat and linear, with a similarly shaped upper surface. The band would be shaped accordingly to move and selectively cover or uncover the upper surface of the base.

In a further aspect of the invention, the combination and structure of the base, flexible band and control mechanism can be adapted to function as an actuator. For example, by providing a source of gas under pressure, in communication with the volume between the first portion and second portion of the band as described above, and by closing off all other sides of this volume, gas supplied to the volume causes the band to move forwardly. Then, coupling an object to the second portion of the band will result in the object being moved (actuated) simply by supply of gas to the volume between the first and second portions of the band.

BRIEF DESCRIPTION OF THE DRAWINGS

The above and other objects, features and advantages of the invention will become apparent from a consideration of the following detailed description presented in connection with the accompanying drawings in which:

FIG. 4 is a side, cross-sectional view of a two-band linear actuator made in accordance with the present invention;

FIG. 5 is a side, cross-sectional view of a valve using a continuous band for differential flow control of fluid, in accordance with the present invention;

FIG. 6 is a perspective, partially cutaway view of a valve utilizing two continuous bands for controlling flow of fluid, in accordance with the present invention;

FIG. 7 is a perspective, partially cutaway view of a valve, utilizing a flexible band, to control the flow of fluid through a plurality of apertures, in accordance with the present invention;

FIG. 8 is a perspective, partially cutaway view of a valve, utilizing a flexible band, for controlling the flow of fluid through an orifice whose width gradually varies in the direction of movement of the band, in accordance with the present invention;

FIG. 9 is an end, cross-sectional view of another embodiment of a valve utilizing a flexible band whose movement is controlled by a rotatable element, in accordance with the present invention;

FIGS. 10A and 10B show respectively a perspective view and a side, elevational view of a valve utilizing an annular flexible band, in accordance with the present invention;

FIG. 11 is an end, cross-sectional view of a four-way valve utilizing two continuous bands, in accordance with the present invention;

FIG. 12 is a side, cross-sectional view of another embodiment of a valve for differential flow control utilizing a rotational control element, in accordance with the present invention;

FIG. 16 is a side, cross-sectional view of a four-way, two-continuous band valve/actuator, made in accordance with the present invention;

FIG. 17 is a side, schematic representation of a band actuator controlled band valve, made in accordance with the present invention;

FIG. 18 is a side, schematic representation of a solenoid controlled band valve, made in accordance with the present invention;

FIG. 19 is a side, schematic representation of a voice coil controlled band valve, made in accordance with the present invention; and FIG. 20 is a side, schematic representation of a motor controlled band valve, made in accordance with the present invention.

DETAILED DESCRIPTION

Figure 1A:
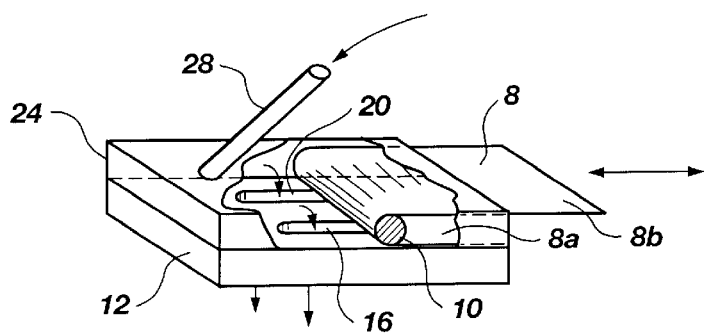
FIGS. 1A and 1B are perspective and side elevational views respectively of a valve, utilizing band control, made in accordance with the principles of the present invention.
Figure 1B:
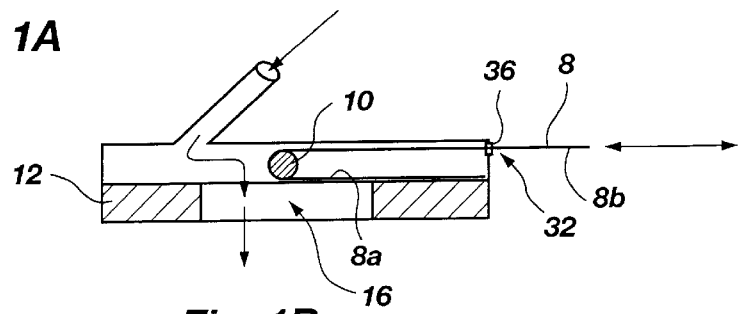

Referring to FIGS. 1A and 1B, there is shown one illustrative embodiment of a valve utilizing band control, in accordance with the present invention. The valve includes an elongate, flexible band 8, one end 8a of which is affixed, by a suitable adhesive, pin or other fastening means, to a base 12 having a generally planar upper surface. Formed in the base 12 are a pair of elongate openings 16 and 20 (but could be more or fewer openings) which extend from the upper surface of the base 12 through to a bottom surface thereof. Disposed over the upper surface of the base 12 is a cover 24 having a fluid inlet 28 for receiving fluid and directing it to the volume within the cover 24. A slot 32 is formed in the rear of the cover 24 to allow a free end 8b of the band 8 to extend therethrough as shown. A seal 36 is formed in the slot 32 to allow sliding movement of the band 8 while preventing fluid from exiting from within the cover 24. In effect, the band 8 extends from the affixed end 8a forwardly and then upwardly and rearwardly out the slot 32 to terminate in the free end 8b.

To support the band 8, a generally rigid cylindrical insert 10 may be disposed in the fold of the band so that when the free end 8b of the band were moved (forwardly or rearwardly), the cylindrical insert would roll with the band and maintain to some extent the rigidity of the band. This could be especially useful in valves with high flow rates where the flow rates might otherwise tend to distort the band. The provision of the cylindrical insert would also be useful in valves that need to be very precise with regard to when the flow is to begin and when it is to end. The cylindrical insert 10 could be held in place electrostatically, by providing an exterior roughened surface on the cylindrical insert and on that part of the band contacted by the cylindrical insert, so that friction holds it in place, etc.

Movement of the free end 8b of the band 8 forwardly or rearwardly determines the degree to which the openings 16 or 20 are covered by the band, and thus the amount of fluid allowed to flow from within the cover 24 out through the openings 16 and 20. In particular, when the free end 8b of the band 8 is moved forwardly, more of the band covers the openings 16 and 20 so that less fluid is allowed to flow therethrough and out from within the cover 24, whereas when the free end 8b of the band is moved rearwardly, more of the openings 16 and 20 are uncovered to allow more fluid to flow thereout. In the manner described, the amount of fluid flowing through the inlet 28 and out through the openings 16 and 20 is controlled by movement and positioning of the band 8.

The band 8 might be constructed of any suitably flexible and yet sturdy material, for example, metal, such as stainless steel, or rubber, such as nitrile rubber, plastic. The band 8, base 12 and cylindrical insert 10 may be fabricated using microfabrication techniques, with the base 12 and cylindrical insert 10 being made of silicon, metal, such as stainless steel, plastic. The cover 24 might illustratively be made of plastic. The seal 36 might be a sphincter seal such as described in U.S. Pat. No. 5,632,606, or other suitable seal.

Figure 2:
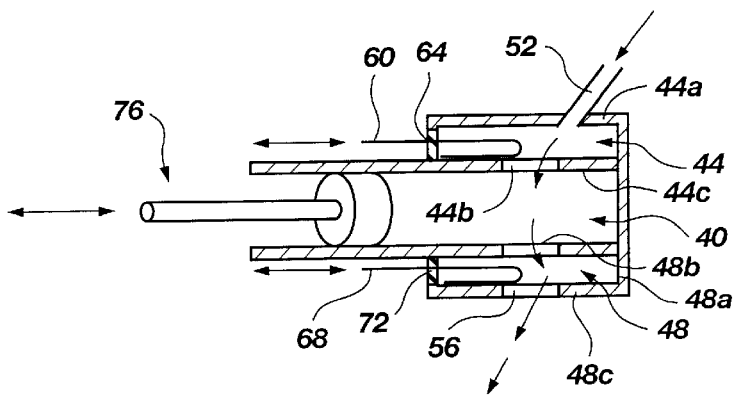
FIG. 2 is a side, cross-sectional view of a two-way variable valve/actuator made in accordance with the present invention.

FIG. 2 is a side, cross-sectional view of a two-way variable valve/actuator having a central cylindrical chamber 40 and two associated chambers 44 and 48 defined by housings 44a and 48a, with an opening 44b formed in a bottom wall 44c allowing for communication between chamber 44 and chamber 40, and an opening 48b allowing communication between chamber 40 and chamber 48. An inlet 52 allows for introduction of fluid from a fluid source under pressure (not shown) into the chamber 44, and an exit opening 56 formed in a bottom wall 48c allows for exit of fluid from the chamber 48. The bottom walls 44c and 48c of chambers 44 and 48 respectively are generally planar.

A flexible band 60 is disposed with one end attached to the bottom wall 44c and the other end extending forwardly, upwardly and then rearwardly out of an opening 64, with seal, in the housing 44a, as generally shown, such that when the free end of the band is moved forwardly (to the right in FIG. 2), the band is caused to cover opening 44b and prevent fluid from flowing from chamber 44 to chamber 40. A flexible band 68 is similarly disposed with one end attached to the bottom wall 48c, with the other end extending forwardly, upwardly and then rearwardly out of an opening 72, with seal, in the housing 48a, again as shown. When the free end of the band 68 is moved forwardly, the band is caused to cover the opening 56 and block the exit of fluid from the chamber 48. When either the band 60 or the band 68 is moved rearwardly, the respective openings 44b or 56 are uncovered to allow the flow of fluid therethrough.

Disposed to slide forwardly or rearwardly in the cylindrical chamber 40 is an actuable piston 76. The piston 76 may in turn be connected to an object or element which is to be moved either forwardly or rearwardly, e.g., to cause some operation to take place, when the piston is moved forwardly or rearwardly. The piston 76 may be caused to move rearwardly (to the left in FIG. 2) when the band 68 has been moved forwardly to cover exit opening 56 and when band 60 has been moved rearwardly to uncover opening 44b to thus allow fluid entering inlet 52 to fill and pressurize chamber 40. As the chamber 40 is pressurized, the piston 76 is caused to move rearwardly. After the piston 76 has been caused to move the desired distance rearwardly, the band 68 may be moved rearwardly to uncover exit opening 56 and allow the escape of fluid. This releases the pressure in chamber 40 so that piston 76 is no longer forced rearwardly.

Movement of the piston 76 forwardly again would be carried out by the object to which it is connected.

In the manner described, a combination of band valves allows for actuating a piston 76 which, in turn, may be used to move or cause operation of another object or element.

Figure 3:
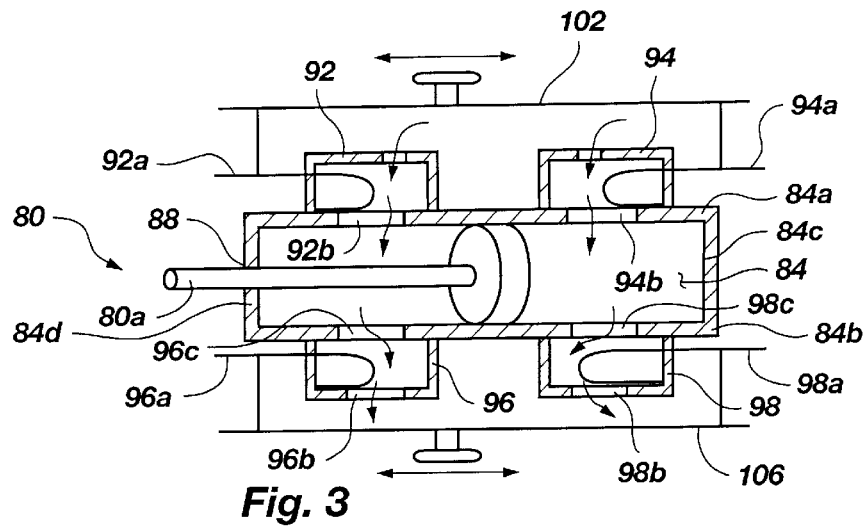
FIG. 3 is a side, cross-sectional view of a four-way variable valve/actuator made in accordance with the present invention.

FIG. 3 is a side, cross-sectional view of a four-way variable valve/actuator in which a piston 80 may be selectively moved forwardly (to the right in FIG. 3) or rearwardly (to the left in FIG. 3), as will next be discussed. The piston 80 is disposed in a generally cylindrical chamber 84 formed by walls including a top wall 84a and a bottom wall 84b. A forward end wall 84c and a rearward end wall 84d complete the enclosure of the chamber 84. An opening, with seal 88, is formed in the rearward end wall 84d to allow for a rod 80a of the piston 80 to slidably extend out of the chamber 84.

A pair of band valves 92 and 94, including control bands 92a and 94a respectively, are disposed on the upper wall 84a of the chamber 84 to control the flow of fluid from the band valves through openings 92b and 94b formed in the top wall 84a, to thus control the flow of such fluid into chamber 84. The band valves 92 and 94 are constructed similarly to that of FIGS. 1A and 1B.

A second pair of band valves 96 and 98, with control bands 96a and 98a respectively, are disposed on the bottom wall 84b of the chamber 84, in a manner similar to the band housing 48a of FIG. 2. The band valves 96 and 98 control the flow of fluid through openings 96b and 98b to thus control the outflow of fluid from chamber 84 through openings 96c and 98c respectively formed in the bottom wall 84b.

Bands 92a and 94a are coupled together by a valve control element 102 so that when the valve control element is moved either forwardly (to the right in FIG. 3) or rearwardly (to the left in FIG. 3), the bands 92a and 94a are caused to move respectively to uncover opening 94b and cover opening 92b or cover opening 94b and uncover opening 92b. Similarly, a valve control element 106 is coupled to both bands 96a and 98a to control the outflow of fluid through openings 96b and 98b respectively, and thus through openings 96c and 98c respectively. Operation of the four-way variable valve/actuator of FIG. 3 will next be discussed.

If it is desired to move the piston 80 rearwardly (to the left in FIG. 3), the control element 102 is moved forwardly (to the right) to cover opening 92b and uncover opening 94b to allow fluid to flow under pressure into the chamber 84 on the forward side of the piston. Also, the control element 106 is moved rearwardly (to the left) to uncover opening 96b and allow fluid to flow out therefrom, and cover opening 98b to prevent outflow of fluid so that pressure will build on the forward side of the piston 80a, forcing it rearwardly as desired. To force the piston forwardly (to the right), the control elements 102 and 106 are moved in the opposite directions as described above. In this manner, the piston 80 may be selectively moved either rearwardly or forwardly, to cause actuation of some external element.

FIG. 4 is a side, cross-sectional view of a two-band linear actuator which includes a pair of base elements 152 and 156 spaced apart and generally parallel with one another. A pair of elongate, flexible bands 160 and 164 are each joined at one end to a side of a respective base element 152 and 156 to extend forwardly along the surface of the respective base element and then inwardly and rearwardly where the other ends are joined together as shown in FIG. 4. The other ends of the bands 160 and 164 are coupled to an object 168 which is to be selectively moved either forwardly (to the right) under control of fluid under pressure from a fluid source 170, or returned rearwardly by force of a spring 174, when fluid pressure is released or received back into the fluid source 170. The fluid pressure source 170 is coupled by fluid pressure lines 170a and 170b through rear end walls 172 and 174b to the volumes 172a and 174a defined by the end walls 172 and 174b, base elements 152 and 156, bands 160 and 164, and side walls (only one of which 176 is shown) extending between base elements 152 and 156 on either side thereof and in sliding contact with the opposite edges of the bands 160 and 164.

Disposed in the folds of the bands 160 and 164 are hollow resilient cylinders 162 and 166 respectively. The cylinders 162 and 166 extend between side walls of the band housing, only one of which, 176, is shown. In effect, the resilient hollow cylinders 162 and 166 provide a seal to prevent the flow of fluid from volumes 172a and 174a past the cylinders 162 and 166 and bands to the forward part of the housings. Advantageously, the cylinders 162 and 166 could be made of a resilient rubber or plastic, and further could be provided with slots spaced apart axially to provide even more axial compliance.

As indicated earlier, when it is desired to move the object 168 forwardly, fluid under pressure is supplied by the fluid pressure source 170 to the volumes 172a and 174a, forcing the bands 160 and 164 to move forwardly and thus pull the object 168 forwardly. If it is desired to move the object 168 rearwardly, then the fluid pressure source 170 withdraws fluid from the volumes 172a and 174a, allowing the spring to return the object 168 rearwardly.

FIG. 5 is a side, cross-sectional view of a band valve using a continuous band for differential flow control of fluid, in accordance with the present invention. The valve includes a valve control handle 180 for controlling the flow of fluid through channels 186a and 186b spaced apart in a planar base 184. A flexible band 200 is formed into a loop and disposed on the upper surface 196 of the base 184 to roll back and forth over a locus in which the channels 186a and 186b are disposed. A flexible top housing 198 is formed to enclose the top surface 196 of the base 184, and the band 200, and to seal about the control handle 180. A fluid inlet 199 allows for introduction of fluid into the housing 198.

In operation, when the handle 180 is moved to the right, channel 186a is uncovered and 186b is covered to allow fluid to flow through channel 186a. When the handle 180 is moved to the left, the opposite occurs. When the handle 180 is pushed downwardly, both channels 186a and 186b are covered (as shown in FIG. 5) to prevent the flow of fluid through the channels, and when the handle 180 is moved upwardly, both channels 186a and 186b are uncovered to allow the flow of fluid through both. (The band 200 is joined to the upper surface 196 of the base 184 at a single point 197 between the channels 186a and 186b.) In the manner described, by use of a single control handle 180, the valve of FIG. 5 may be operated to allow fluid to flow through either of the channels 186a and 186b, neither of the channels, or both of the channels.

FIG. 6 is a perspective, partially cutaway view of a valve utilizing two continuous bands for controlling flow of fluid by way of a joystick 204. The valve includes a planar base 208 in which are formed four pairs (or could be single) of openings 212, 216, 220 and 224, positioned along intersecting imaginary lines as shown. Disposed on the base 208 on the upper surface 228 thereof are two flexible bands 232 and 236 both formed into loops and disposed crosswise of one another. The joystick 204 is pivotally affixed in the base 208 to extend upwardly through openings in the bands 232 and 236, including openings 240 formed in band 236 and opening 244 formed in band 232. To allow movement of the joystick 204 without bending either of the bands 232 and 236 sideways, the openings 240 and 244 are formed crosswise in the respective bands and crosswise with respect to one another, as shown in FIG. 6. Thus, the joystick 204 may be moved toward and cover the pairs of openings 216 or 224 to move the band 232 without bending the band 236 sideways. Similarly, the joystick may be moved to cover the pairs of openings 212 or 220 to move band 236 without bending band 232 sideways. Such movement of the joystick 204 and thus of the bands 232 and 236 allows for covering one pair of oppositely disposed pairs of openings while uncovering the other of the opposite pair, with the crosswise pairs remaining open (or if the openings were all disposed under the bands when the bands were in the neutral position, then the crosswise openings would remain covered).

A flexible housing 250 (shown in fragmented form in FIG. 6) encloses the top surface 228 of the base 208 and seals about the joystick 204, in a manner similar to the housing of FIG. 5. A fluid inlet to the volume within the housing 250 would also be provided similar to that shown in FIG. 5.

FIG. 7 is a perspective, partially cutaway view of a valve, utilizing a flexible band, to control the flow of fluid through a plurality of apertures to control, for example, a plurality of actuable elements such as pistons. The valve includes a flexible band 370 coupled to a control element 374 by which the band 370 is moved forwardly or rearwardly. The band 370 is attached to a base 378, as previously described, at one end, with the other end extending forwardly, upwardly and then rearwardly out of an opening, with seal, of a housing 380 (shown only in fragmented form in FIG. 7 but being disposed similarly to the housings of FIGS. 1–3). Although not shown, a cylinder, similar to cylinder 10 of FIGS. 1A and 1B, could be disposed in the fold of the band 370.

Formed in the base 378 are a plurality of openings 382 positioned at selected intersections of an imaginary grid in the base so that as the band 370 is rolled over the base, different combinations of openings are uncovered or covered to respectively allow the flow of fluid therethrough or to block the flow of fluid, which would be introduced into the housing 380 as previously discussed.

FIG. 8 is a perspective, partially cutaway view of a valve, utilizing a flexible band for controlling the flow of fluid through an orifice whose width gradually varies in the direction of movement of the band. The valve includes a base 424 in which is formed an elongate opening 436 of varying width as shown. A band 420 is disposed to roll over and unroll from the upper surface of the base 424 as previously discussed. A housing 430 is formed over the base 424, with the band 420 extending through an opening, with seal, at the rear of the housing, again as previously described.

By controlling the position of the band 420 as it overlays the upper surface of the base 424, the amount of fluid flowing through the opening 436 in the base may be controlled. Further, since the opening 436 varies in width in the direction of movement of the band, the amount of fluid flowing through the opening 436 is a nonlinear function of the magnitude of movement of the band 420.

FIG. 9 is an end, cross-sectional view of another embodiment of a valve utilizing a flexible band whose movement is controlled by a rotatable element, in accordance with the present invention. The valve includes a hollow cylinder 500 in which is disposed to rotate another cylinder 504 having a shaft 508 which extends (out of the page) through an opening, with seal, in an end wall 512. Another end wall is located on the other side of the cylinder 504 to seal said other side. An inlet opening 516 is formed at one location in the hollow cylinder 500 and an outlet opening 520 is formed at a circumferentially spaced apart location in the hollow cylinder 500. A flexible band 524 is disposed between the hollow cylinder 500 and the inner rotatable cylinder 504 and is attached at one end 524a to the inner wall of the hollow cylinder 500 and at the other end 524b to the rotatable cylinder 504.

Control of the flow of fluid from the inlet 516 to the outlet 520 is done by rotation of the cylinder 504 such that when rotated in the counterclockwise direction, the band 524 uncovers the outlet 520 to allow the flow of fluid therethrough, and when rotated in the clockwise direction, the band 524 covers the outlet 520 to prevent the flow of fluid.

FIGS. 10A and 10B show respectively a perspective view and a side, elevational view of a valve utilizing an annular flexible band 280. The band 280 is folded over itself to contact both the upper surface 284 of a base 288, and the underneath surface of a disk 292 mounted to rotate with a shaft 296 (FIG. 10B). A housing 294 is formed about the base 288, band 280, disk 294 and is sealed about the shaft 296. Channels 298a and 298b are formed in the base 288 in a partial circle as best seen in FIG. 10A so that as the shaft 296 and thus the disk 292 are rotated, that portion of the band 280 which is in contact with the disk 292 is carried with the disk so that the lower portion of the band progressively covers and uncovers different portions of the channels 298. The band 280 might illustratively be affixed to the lower surface of the disk 292 although with appropriately fabricated bands, the holding of the band 280 to the underneath surface of the disk could be accomplished by electrostatic attraction, surface tension with a thin film of liquid, magnetization, etc. When the band 280 is not attached either to the disk 292 or the upper surface 284 of the base 288, it is self-aligning in the radial direction, i.e., it will automatically space itself uniformly about the shaft 296.

The valve of FIGS. 10A and 10B, of course, allows for controlling the flow of fluid from an inlet 299 through the channels 298a and 298b by rotating the shaft 296 so that the band 280 either covers or uncovers the channels.

FIG. 11 shows a four-way valve/actuator controlled by a rotary element. The valve/actuator includes a hollow cylinder 310 in which is rotatably disposed an inner cylinder 304. Two flexible bands 316 and 318, formed into loops, are disposed between the cylinder 304 and cylinder 310 to roll over the interior surface of the cylinder 310 and the exterior surface of the cylinder 304, as the cylinder 304 is rotated about an axle 320 having a fixed axis. The axle would extend out an end wall through an opening, with seal, to enable rotating the axle and thus the cylinder 304.

A source of fluid under pressure 306 provides fluid through an opening 307 to the interior space between cylinders 310 and 304. Divider walls 308a and 308b define separate volumes 309 and 311 within cylinder 310 and prevent communication therebetween. Volume 311 is further divided into volumes 311a and 311b by a divider wall 308c. Conduits 312 and 313 are coupled through circumferentially spaced openings in the wall of cylinder 310 to carry fluid to an actuable hollow cylinder 317, to respective opposite sides of a piston 319 slidably disposed in the cylinder 317. Conduits 314 and 315 carry fluid from the actuable cylinder 317, from respective opposite sides of the piston 319 back through openings to the volume 311a and 311b. Fluid may exit volume 311a through a conduit 321 to a sink 322, and fluid may exit 311b through a conduit 323 to sink 322.

In operation, when cylinder 304 is rotated clockwise, the band 318 is similarly rolled clockwise to allow fluid to flow through conduit 312 to the cylinder 317, on the left side of piston 319 and, since band 316 also rolls clockwise to prevent fluid from flowing through conduit 314 to the sink 322, pressure builds on the left side of the piston 319 causing it to move to the right. When the cylinder 304 is rotated counterclockwise, both bands 316 and 318 likewise are rotated counter-clockwise so that band 318 prevents fluid from flowing through conduit 312 but allows fluid to flow through conduit 313 to the volume to the right of piston 319 in cylinder 317. Since band 316 has been moved to a position to prevent flow of fluid through conduit 315 to the sink 322, pressure builds on the right side of piston 319 forcing the piston leftwardly. A piston rod 319a extends out an opening, with seal 317a for connection to an object or element which is to be actuated.

It should be noted that the end walls (not shown) covering the ends of cylinder 310 are spaced from the edges of the bands 316 and 318 so that fluid can flow past the edges of the bands.

Is FIG. 12 is a side, cross-sectional view of another embodiment of a valve for differential flow control utilizing a rotational control element. In particular, a cylinder 324 is disposed to rotate about a fixed axis 325 to cause a band 326 formed into a loop to roll back and forth on the surface of the base 328 in which are formed a pair of linearly spaced-apart channels 330 and 332. A housing 334 is disposed over the base 328, band 326 and cylinder 324, with a shaft coinciding with the axis 325 extending through an opening, with seal, in the side of the housing to enable rotation of the cylinder 324 from outside the housing. An inlet 336 is formed to supply fluid to the interior of the housing 334.

In operation, when the cylinder 324 is rotated counterclockwise, it causes the band 326 to roll to the right and uncover channel 332 and cover channel 330, whereas when the cylinder is rotated clockwise, channel 330 is uncovered and channel 332 is covered. In this manner, fluid can be selectively directed out of either channel 330 or 332.

Figure 13:
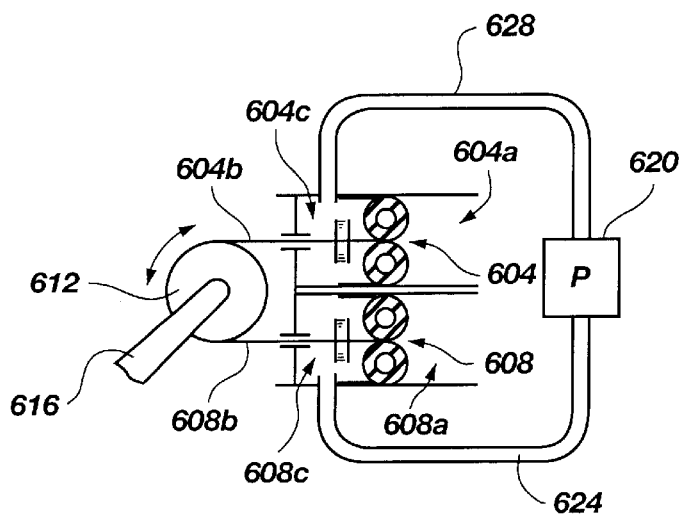
FIG. 13 is a side, cross-sectional view of an opposed force, rotary actuator, made in accordance with the present invention.

FIG. 13 is a side, cross-sectional view of an opposed force rotary actuator, in which two pair of flexible bands 604 and 608 are disposed within chambers 604a and 608a respectively in a manner similar to the arrangement of FIG. 4. Here, the joined ends 604b of the band pair 604 and the joined ends 608b of the band pair 608 are coupled to the exterior of a cylinder 612 which is disposed to rotate. A lever 616 is attached to the cylinder 612 so that when the cylinder rotates, the lever likewise rotates.

The cylinder 612 is caused to rotate in the clockwise direction when a source of fluid under pressure 620 supplies fluid, via conduit 628, to a volume 604c defined by the band pair 604, and withdraws the fluid, via conduit 624, from a volume 608c defined by the band pair 608. Supplying fluid to the volume 604c causes the band pair 604 to move to the right and pull the joined ends 604b and thus rotate the cylinder 612 in the clockwise direction. Rotation of the cylinder in a counterclockwise direction would be carried out by the source of fluid 620 supplying fluid to the volume 608c and withdrawing fluid from the volume 604c. In this manner, rotary actuation of a cylinder 612 and lever 616, may be carried out using an opposed pair of bands.

Figure 14:
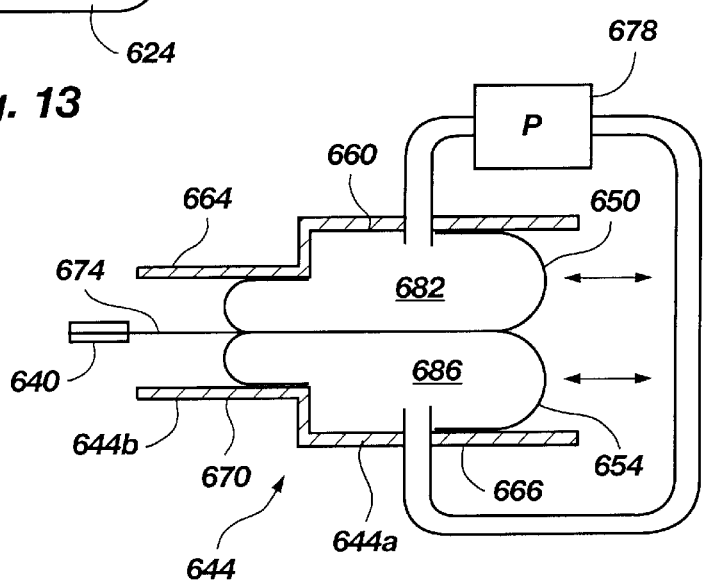
FIG. 14 is a side, cross-sectional view of a four-band actuator, made in accordance with the present invention.

FIG. 14 is a side, cross-sectional view of a two-band actuator for causing movement of an object 640. Here, a housing 644 includes an enlarged section 644a and a reduced section 644b, and side walls (not shown). A pair of bands 650 and 654 are each looped, with one end of band 650 attached to the inside surface of housing wall 660, and the other end looped downwardly, rearwardly and then forwardly where it is attached to the inside surface of wall 664 of the reduced section 644b of the housing 644. The other band 654 similarly includes one end attached to the inside surface of wall 666, with the other end being attached to the inside surface of wall 670 of the reduced section of 644b of the housing 644. The two bands 650 and 654 are in contact generally in the center of the housing 644 at which location they are joined to a linear band or bar 674 which is coupled to the object 640.

To cause the bar 674 and thus object 640 to move to the right in FIG. 14, fluid from a source 678 is supplied to the volumes 682 and 686 defined by bands 650 and 654 respectively, causing the bands to move to the right since pressure in the volumes acts against a greater surface area defined by the right side of the bands than by the left side of the bands. The bands 674 and thus object 640 would be moved leftwardly by external means.

Figure 15:
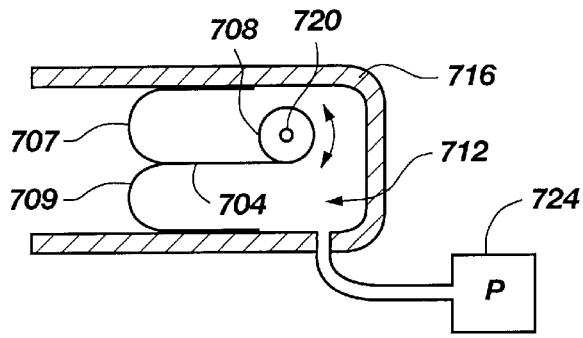
FIG. 15 is a side, cross-sectional view of a two-band rotary actuator made in accordance with the present invention.

FIG. 15 is a side, cross-sectional view of a two-band rotary actuator which is similar to the arrangement of FIG. 4 except that the joined portions 704 of the two bands 707, 709 are coupled to the exterior of a cylinder 708 which is disposed to rotate depending upon the pressure in the volume 712 defined by the bands and housing 716. An axle 720, on which the cylinder 708 is mounted, extends out an opening, with seal, in one side of the housing.

When fluid from a source of fluid under pressure 724 is supplied to the volume 712, the band pair 704 is caused to move to the left and thus cause the cylinder 708 to rotate clockwise and turn the axle 720 to thus provide rotary actuation. The band pair 704 is caused to move to the right by external rotation of the axle 720 in the counterclockwise direction.

FIG. 16 is a side, cross-sectional view of a four-way, two-continuous band valve/actuator in which a pair of bases 874 and 890 are provided with a continuous loop band 864 disposed on the base 874 and a continuous loop band 868 disposed on the base 890. Conduits 872 and 876 extend through the base 874 to the top surface thereof and also to an actuation cylinder 873. A piston 875 is disposed in the actuation cylinder 873 and includes a rod 877 which extends from the piston through an opening, with seal, in one end wall of the cylinder to the outside. A housing 879 is disposed on the base 874 to enclose the band 864 as with previous arrangements. A pair of conduits 886 and 888 extend through the base 890 to the upper surface thereof to allow evacuation of fluid as will be discussed momentarily. A conduit 881 couples the interior of the cylinder 873, on the left of piston 875, to one side of the interior of a housing 885 disposed on the base 890. Another conduit 883 couples the interior of the cylinder 873, on the other side of the piston 875, to the other side of the interior of the housing 875. A coupling bar 887 is mounted on the tops of band loop 864 and band loop 868 so that when the bar 887 is moved either to the right or to the left, both bands are caused to roll on the respective surfaces of the bases 874 and 890.

In order to cause actuation of the piston 875 and thus of the rod 877, and in particular to cause the piston and rod to move to the right, the coupling bar 887 (which extends through respective openings in the housings 879 and 885) is moved to the right, causing the bands 864 and 868 to be rolled to the right so that fluid from a source 889 flows into the housing 879 and through the conduit 872 (which is uncovered by the band 864) and into the cylinder 873 to the volume on the left of the piston 875. This, of course, causes the piston and thus the rod 877 to move to the right. The fluid is not allowed to flow out from the volume to the left of piston 875 through conduit 881 because the band 868 is covering the exit conduit 888.

When the coupling bar 887 is moved to the left, causing the bands 864 and 868 to roll to the left, fluid flows from the interior of the housing 879 through conduit 876 to the volume of the cylinder 873 on the right of the piston 875. This causes the piston to be moved to the left, causing the rod 877 to also move to the left. Fluid is not allowed to flow from this volume in the cylinder 873 since the exit conduit 886 is covered and to prevent fluid in conduit 883 from flowing therethrough. Thus, by selectively moving the coupling rod 887 to the right or to the left, the piston 875 and rod 877 can be caused to respectively move to the right or to the left.

FIGS. 17 through 20 show different mechanisms for moving the free end of a band of the band valves described, to thus control operation of the valves. FIG. 17 is a side, schematic representation of a band actuator controlled band valve in which two pairs of bands 904 and 908 are disposed in housings 904*a* and 908*a* respectively in a manner similar to the arrangement of FIG. 4, except that the joined ends of the band pair 904 which extend out an end wall of the housing are coupled to the joined ends of the band pair 908 at a general midpoint 912. The midpoint 912 is coupled to a bar 916 which, in turn, is coupled to a plate 920 on the lower surface of which is attached one end of a band 924. The other end of the band 924 is attached to the upper surface of a base 928 in which is formed an opening 932.

When fluid is supplied under pressure from a source 936 to the volume defined by the band pair 904, that band pair is caused to move to the left thereby moving the bar 916 and plate 920 to the left and causing the band 924 to unroll from over the opening 932 to allow fluid to flow therethrough. When fluid is supplied under pressure from a fluid source 938 to the volume defined by the band pair 908, the band pair is caused to move to the right and thus cause the band 924 to move to the right and cover the opening 932 to prevent the flow of fluid therethrough.

FIG. 18 shows a solenoid controlled band valve in which a movable core element 950 of a solenoid 954 is attached to a plate 958, the underside of which is attached to one end of a flexible band 964. The other end of the band 964 is attached to the upper surface of a base 966 in which is formed an opening 968. The other end of the plate 958 is connected to a spring 962.

In operation, when the solenoid 954 is energized, the core element 950 is pulled to a center position within the solenoid, pulling the plate 958 to the left and thus causing the band 964 to unroll from over the opening 968 to allow fluid to flow therethrough. When the solenoid 954 is deenergized, the spring 962 pulls on the plate 958 which, in turn, pulls on the movable core element 950 and causes the band 964 to move to the right and cover the opening 968.

FIG. 19 shows a voice coil controlled band valve in which a voice coil 970, operated under control of a current source 972, causes an armature 973 wrapped with a wire coil 974, to move to the left or to the right. The armature 973 is coupled to a control bar 975 which, in turn, is coupled to one end of a flexible band 978. The other end of the band 978 is attached to the upper surface of a base 981 in which is formed an opening 982. Depending on the direction of current supplied to the coil 974, the armature 973 is caused to move to the left thereby moving the band 978 to the left to uncover the opening 982. A spring 980 causes the band 978 to move to the right to cover the opening 982. In this manner, the flow of fluid through the opening 982 is controlled.

FIG. 20 shows a motor controlled band valve in which a tether 990 is wrapped about the rotor 991 of a motor 991*a*, the tether being attached to the free end of a band 992. The other end of the band is attached to the upper surface of a base 995, in which is formed an opening 996. The tether 990 is also attached at end 993 to a spring 994 to urge movement of the tether and thus the band 992 forwardly to cover the opening 996 to prevent the flow of fluid therethrough. When the motor 991*a* is operated to cause the rotor 991 to rotate, the tether 990 is pulled rearwardly and wrapped about the rotor to thus cause the band 992 to be moved rearwardly and uncover the opening 996.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An actuator for converting rotational motion into linear motion, comprising:

a) a fluid source that is pressurized;

b) a fluid sink;

c) a rotary motion fluid controller, including:
   i) a cylindrical housing, coupled to the fluid source and sink, and fixed in position;
   ii) a rotating body, located within the housing;
   iii) a first and second flexible band, each having one end coupled to the rotating body and a second end, opposite the first end, coupled to the housing;
   iv) whereby rotation of the rotating body will cause the first and second flexible bands to cover different portions of the rotating body and housing;
   v) a first and second divider wall, positioned between the housing and rotating body to create an inlet and outlet volume, where the fluid source and sink are connected respectively thereto;
   vi) a first and second outlet conduit, coupled to the housing proximate the inlet volume and positioned to be covered and uncovered by the first flexible band; and
   vii) a first and second inlet conduit, coupled to the housing proximate the outlet volume and positioned to not be covered and uncovered by the second flexible band;

d) a linear motion actuator, having:
   i) a housing, coupled to the first and second outlet conduit to receive fluid from the inlet volume, and coupled to the first and second inlet conduit to export fluid to the outlet volume; and
   ii) a device, positioned within the housing and having the first inlet and outlet conduit on one side thereof and the second inlet and outlet conduit on another side thereof; and e) wherein the sink further has a first and second sink conduit, coupled to the outlet volume and positioned to be covered and uncovered by the second flexible band.

2. An actuator for converting rotational motion into linear motion, comprising:
   a) a fluid source that is pressurized;
   b) rotary means, coupled to the fluid source, for directing the fluid between two rotary outlet conduits in a combination related to the amount and direction of rotation the rotary means further including:
      1) a cylindrical housing, coupled to the fluid source and sink, and fixed in position;
      2) a rotating body, located within the housing;
      3) a first and second flexible band, each having one end coupled to the rotating body and a second end, opposite the first end, coupled to the housing;
      4) whereby rotation of the rotating body will cause the first and second flexible bands to cover different portions of the rotating body and housing;
      5) a first and second divider wall, positioned between the housing and rotating body to create an inlet and outlet volume, where the fluid source and sink are connected respectively thereto;
      6) a first and second outlet conduit, coupled to the housing proximate the inlet volume and positioned to be covered and uncovered by the first flexible band; and
      7) a first and second inlet conduit, coupled to the housing proximate the outlet volume and positioned to not be covered and uncovered by the second flexible band;
   c) linear means, coupled to the two rotary outlet conduits, for moving a device in a linear direction based upon which of the two conduits is receiving fluid from the fluid source; and
   d) sink means, coupled to the rotary means, for receiving fluid from the linear means through the rotary means.

3. The actuator of claim 2, wherein the linear means further comprising:
   a) a housing, coupled to the first and second outlet conduit to receive fluid from the inlet volume, and coupled to the first and second inlet conduit to export fluid to the outlet volume; and
   b) a device, positioned within the housing and having the first inlet and outlet conduit on one side thereof and the second inlet and outlet conduit on another side thereof.

4. The actuator of claim 2, wherein the sink further has a first and second sink conduit, coupled to the outlet volume and positioned to be covered and uncovered by the second flexible band.

* * * * *